United States Patent [19]

Hulle et al.

[11] 4,034,460
[45] July 12, 1977

[54] METHOD OF FORMING AN OPTICAL GRATING

[75] Inventors: Robert M. Hulle, Calabasas; John Ferrero, Chatsworth; Gerard Pannullo, Canoga Park, all of Calif.

[73] Assignee: Trans-Cal Industries, Inc., Van Nuys, Calif.

[21] Appl. No.: 632,186

[22] Filed: Nov. 17, 1975

[51] Int. Cl.² .................................... B23P 17/00
[52] U.S. Cl. .................................. 29/418; 29/445; 29/522; 29/525; 350/320
[58] Field of Search ............ 29/418, 434, 525, 522, 29/445; 350/320; 360/97

[56] References Cited

U.S. PATENT DOCUMENTS

| 2,704,882 | 3/1955 | Olson | 29/418 X |
|---|---|---|---|
| 2,994,950 | 8/1961 | Siegler | 29/434 |
| 3,167,856 | 2/1965 | Zoller | 29/418 X |
| 3,720,930 | 3/1973 | Elsing | 360/97 X |
| 3,871,064 | 3/1975 | Schrader | 350/320 X |
| 3,872,575 | 3/1975 | Lee | 350/320 X |

*Primary Examiner*—Charlie T. Moon
*Attorney, Agent, or Firm*—Fred N. Schwend

[57] ABSTRACT

An optical grating having expansion characteristics equivalent to the thermal expansion characteristics of a preselected material is formed by providing a thin grating sheet of a material different from the preselected material, forming spaced slits in the sheet to overly an opening in an underlying plate of such preselected material, thereafter securing the sheet to the plate along narrow zones outside the opening, and finally removing the portions of the sheet lying outside such zones.

8 Claims, 5 Drawing Figures

METHOD OF FORMING AN OPTICAL GRATING

BACKGROUND OF THE INVENTION

1. Field of the Invention

This invention relates to highly accurate positining apparatus, such as that used for positioning a transducing head adjacent closely spaced data tracks on a magnetic memory disk, and wherein positioning is accomplished by an optical grating having slits spaced at intervals corresponding to the spacing between stations to which the apparatus is to be positioned. for Because the positioning tolerances of such an apparatus are typically measured in millionths of an inch, small changes in ambient temperatues, even in closely controlled environments, can cause errors due to differential expansion of materials to exceed allowable limits.

2. Description of the Prior Art

Previous attempts to correct for differential expansion of materials, involving an optical grating for the above purpose, by employing elaborate electronic or mechanical temperature compensating devices have proved unreliable and costly.

By using a material having exactly the same coefficient of expansion throughout the apparatus, the foregoing problem can be overcome. However, it has been found impractical and too costly to form a grating of the necessary resolution by machining or otherwise forming the grating in a frame or body of the same material, such as aluminum, which would have the necessary rigidity. Attempts have been made to form such grating by using plastic or glass substrates on which the grating is photographically or otherwise formed and then bonding the substrate to the frame. Other attempts have been made to bond a thin nickel or similar substrate onto the frame and to precision etch or machine the grating into the nickel. Such methods have proved unreliable, particularly becuase of the difference in coefficient of expansion of the different metals and because of the problems encountered in choosing a uniform thin film bond to secure the metal that forms the grating, and maintaining this bond for long periods of time and temperature.

SUMMARY OF THE INVENTION

According to the present invention, a frame or plate of the same material as that of the cooperating apparatus, or at least having the same coefficient of expansion, is prepared having an elongate opening therein. A thin grating sheet of nickel or similar material having regularly spaced slits formed therein is laid over the frame and the sheet is integrally united to the frame along narrow parallel zones extending adjacent the side edges of the opening.

According to a more specific aspect of the invention, grooves are formed in the frame along such zones and the overlying portions of the grating sheet are forced into the grooves. Malleable bars, preferably of the same material as that of the frame or, at least, having the same coefficient of thermal expansion, are pressed into the grooves. Sufficient force is applied to upset or swage the bars to permanently lock the grating in place. Thereafter, the portion of the grating sheet located on the outside of the bars is removed, leaving a grating which will readily follow the expansion and contraction of the underlying frame.

DESCRIPTION OF THE PREFERRED EMBODIMENT

Figure 1:
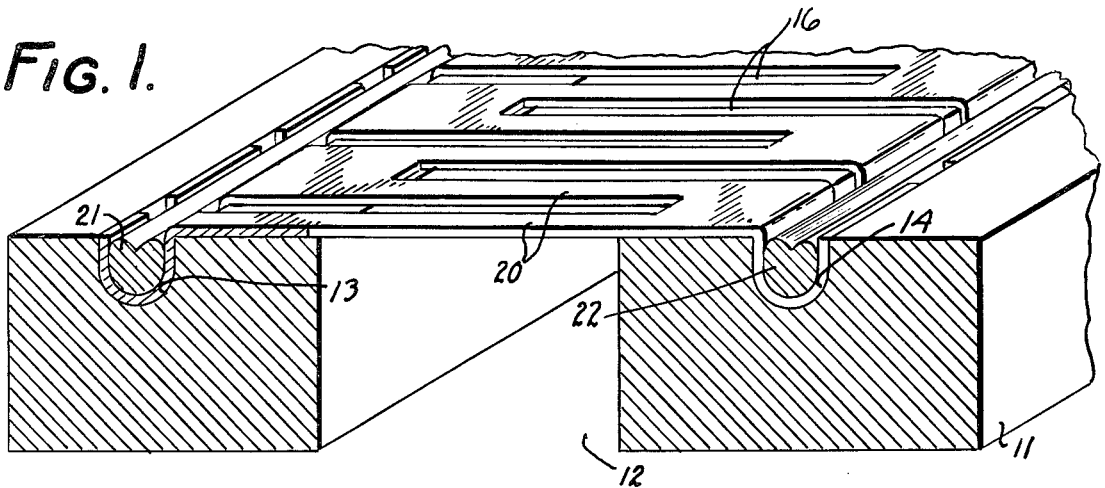
FIG. 1 is a greatly enlarged perspective view, partly in section, illustrating a part of a complete scale or grating assembly made in accordance with the present invention.
Figure 2:
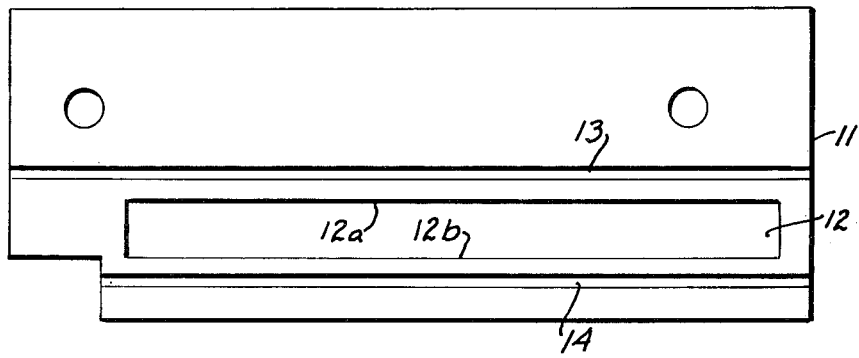
FIG. 2 is an enlarged plan view of the frame plate per se.

Referring to the drawings, a rigid frame plate 11 is provided with an elongated rectangular opening 12 formed therein. The plate 11 is formed of the same material as the remainder of the apparatus to which it is to be connected or, at least, it should have the same thermal expansion characteristics. Typically, in the case of a data handling apparatus comprising a magnetic disk memory system, the material of the apparatus would be aluminum and the material of the plate 11 would preferably be the same. However, other systems may be constructed of steel or other structural materials and the plate 11 would also preferably be formed of the same material or would have the same coefficient of thermal expansion.

Two grooves 13 and 14 are cut in the top of the plate 11, parallel to and adjacent the side edges 12a and 12b of the opening 12.

A thin grating sheet, preferably of nickel, and on the order of 0.001 inches thick, is formed having a row of regularly spaced slits 16 to extend across the opening 12 of the plate 11. Such slits are formed in two interspersed series, one, i.e. 16a, being offset laterally relative to the other, i.e. 16b. Such slits are all of the same length and therefore the series 16a is offset the same amount as series 16b.

Figure 3:
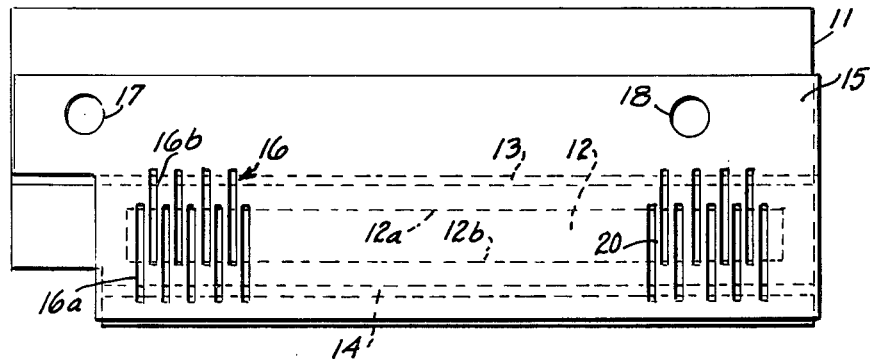
FIG. 3 is an enlarged plan view of the grating sheet overlying the frame plate, prior to the final assembly.

As seen FIG. 3, when the grating sheet 15 is laid over the plate 11 and aligned therewith by means of locating holes 17 and 18, it will be seen that the slits of series 16a terminate substantially in line with the side edge 12a of opening 12 and extend somewhat beyond the groove 14 while the slits of series 16b terminate substantially in line with the opposite side edge 12b of opening 12 and extend somewhat beyond the groove 13.

Typically, the slits 16 may be on the order of 0.005 inches wide and spaced to provide bars 20 which are also 0.005 inches wide.

In such form, the resulting grating sheet 15 may be readily handled and assembled on the plate 11 while maintaining precise spacing between the bars 20.

The sheet 15 with the various slits therein may be formed in any of the number of ways well known in the art. For example, it can be formed by plating a master having the slit areas masked off and then stripping the same from the master, or it can be build up by electrodeposition or sputter-deposition, employing a mask to define the slit areas. On the other hand, the sheet can be chemically etched to form the slits.

In assembling the sheet 15 onto the plate 11, the portions of the sheet overlying the grooves 13 and 14 are forced or drawn into the grooves by means of suitable tools. In doing so, the sheet 15 is tensioned somewhat in a lateral direction. Thereafter malleable bars 21 and 22, preferably of the same material as that of the plate 11 or having the same coefficient of thermal expansion, are pressed into the grooves. The pressure applied against the bars 21 and 22 is sufficient to swage or upset the same toward the sides of grooves 13 and 14, thereby forming a permanent interlocking engagement between the sheet 15 and the plate 11 along two zones located adjacent the side edges of the opening 12.

Figure 4:
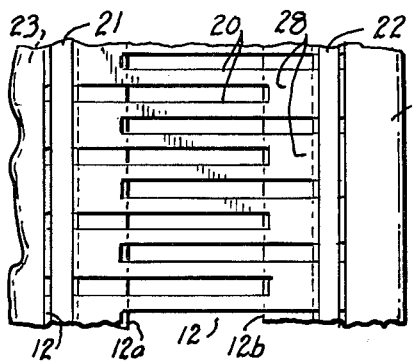
FIG. 4 is an enlarged plan view of part of the finally assembled scale or grating assembly.

Finally, the portions, i.e. 23 and 24, of the sheet 15 lying outside the grooves 13 and 14 are cut away or otherwise removed, leaving the assembly shown in FIGS. 1 and 4. This results in each bar 20 being separate from the adjacent bars while maintaining a precise spacing between such bars. It should be noted that the resulting grating forms an accordion or sinuous configuration so that the grating will readily expand or contract along with the underlying plate 11, regardless of the fact that the sheet 15 may have a different coefficient of expansion than that of the plate 11. Also, a maximum area of interlocking contact is effected between the resulting individual sections, i.e. 28, of the sheet 15 and the sides of the grooves 13 and 14.

Figure 5:
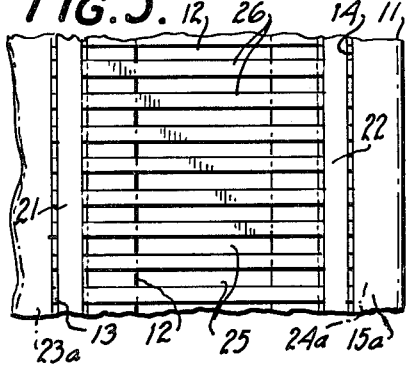
FIG. 5 is an enlarged plan view of a finally assembled scale or grating formed according to a modified method of the present invention.

FIG. 5 illustrates a modified form of scale or grating assembly. In this case, the frame plate 11 is formed in the same manner as is described in FIGS. 1 and 4. However, the grating sheet 15a is formed with a single row of regularly spaced slits 25, all in alignment, and each of a length such that is extends slightly beyond the zones by the grooves 13 and 14 in the plate 11. After the overlying portions of the sheet 15a have been drawn into the grooves 13 and 14, bars 21 and 22 are swaged or upset in the manner previously described and the portions 23a and 24a lying beyond the grooves 13 and 14 are removed, leaving bars 26 which extend across the opening 12 in the plate 11 and which are interlocked to the plate 11. Thus, the grating thus formed will readily expand and contract along with the plate 11.

It will be obvious to those skilled in the art that many variations may be made in the exact method shown without departing from the spirit of this invention For example, although we have found the aforementioned method of integrally uniting the sections of the sheet 15 or 15a to the underlying plate 11 along the prescribed zones to be preferable, the sheet could, according to the more basic aspects of the invention, be welded or brazed along such zones. In cases where the plate 11 is formed of steel or other ferrous metals, the nickel sheet could be welded to the plate 11 along zones now defined by the grooves 13 and 14.

We claim:

1. The method of forming an optical grating having expansion characteristics the same as the thermal expansion characteristics of a preselected material, comprising
    forming a frame plate of said material having an opening with parallel sides therein,
    forming a thin sheet having a width greater than the width of said opening,
    forming a row of first parallel slits in said sheet,
    forming a row of second parallel slits in said sheet interposed between said slits but with portions of said second slits offset laterally beyond said first slits and with portions of said first slits offset laterally beyond said second slits,
    physically interlocking said sheet to said plate along a first zone extending over the offset portions only of said first slits,
    physically interlocking said sheet to said plate along a second zone extending over the offset portions only of said second slits, and thereafter
    removing the portions of said sheet extending outwardly beyond said zones.

2. The method as defined in claim 1 wherein said interlocking step comprises forming grooves in said plate along said zones and forcing the overlying portions of said sheet into interlocking engagement with the sides of said grooves.

3. The method as defined in claim 1 wherein said interlocking step comprises forming grooves in said plate along said zones and forcing elongate members against the portion of said sheet overlying said grooves whereby to draw said overlying portions into said grooves to maintain said overlying portions in interlocking engagement with said plate.

4. The method as defined in claim 1 wherein said interlocking step comprises forming grooves in said plate along said zones,
    forcing rods of a malleable material having the same expansion characteristics as those of said plate against the portions of said sheet overlying grooves whereby to draw said overlying portions into said grooves, and
    swaging said rods in said grooves to maintain said overlying portions in interlocking engagement with said plate.

5. The method as defined in claim 1 comprising forming said sheet of a material having different thermal expansion characteristics than those of said plate.

6. The method as defined in claim 1 wherein said removing step follows said interlocking step.

7. The method of forming an optical grating having expansion characteristics the same as the thermal expansion characteristics of a preselected material, comprising the steps of
    forming a frame plate of said material having an opening with parallel sides therein,
    forming a thin sheet having a width greater than the width of said opening,
    forming a row of parallel slits in said sheet,
    physically interlocking said sheet to said plate along zones extending parallel to the length of said row and intermediate said sides and the ends of said slits, and
    thereafter removing the portions of said sheet lying outside said zones.

8. The method as defined in claim 7 wherein said interlocking step comprises forming grooves in said plate along said zones and forcing elongate members of a malleable material having the same expansion characteristics as said plate against the portions of said sheet overlying said grooves whereby to draw said overlapping portions into said grooves to maintain said overlying portions in interlocking engagement with the sides of said grooves.

* * * * *